(12) United States Patent
Addington

(10) Patent No.: US 6,928,656 B1
(45) Date of Patent: Aug. 9, 2005

(54) METHOD FOR DELIVERY OF IP DATA OVER MPEG-2 TRANSPORT NETWORKS

(75) Inventor: Timothy Hall Addington, Roswell, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/312,121

(22) Filed: May 14, 1999

(51) Int. Cl.$^7$ ............................................. H04N 7/173
(52) U.S. Cl. ..................... 725/111; 725/109; 370/347; 370/352; 370/389; 370/442; 370/465; 370/522; 709/220; 709/221; 709/222
(58) Field of Search ................. 725/111, 109; 370/347, 370/442, 447, 465, 466, 522, 524, 351–356, 370/389, 393, 395.3; 709/220–222

(56) References Cited

U.S. PATENT DOCUMENTS

| | | | | |
|---|---|---|---|---|
| 5,481,542 A | * | 1/1996 | Logston et al. ............ | 370/94.2 |
| 5,483,596 A | | 1/1996 | Rosenow et al. | |
| 5,774,660 A | * | 6/1998 | Brendel et al. ............ | 709/201 |
| 5,850,444 A | | 12/1998 | Rune | |
| 5,894,479 A | * | 4/1999 | Mohammed ................ | 370/401 |
| 5,987,518 A | * | 11/1999 | Gotwald ..................... | 709/230 |
| 6,009,475 A | * | 12/1999 | Shrader ..................... | 709/249 |
| 6,011,548 A | * | 1/2000 | Thacker ..................... | 725/105 |
| 6,052,725 A | * | 4/2000 | McCann et al. ........... | 709/223 |
| 6,061,349 A | * | 5/2000 | Coile et al. ................ | 370/389 |
| 6,065,061 A | * | 5/2000 | Blahut et al. ............... | 709/239 |
| 6,081,533 A | * | 6/2000 | Laubach et al. ............ | 370/421 |
| 6,092,113 A | * | 7/2000 | Maeshima et al. ......... | 709/230 |
| 6,184,878 B1 | * | 2/2001 | Alonso et al. .............. | 345/327 |
| 6,205,477 B1 | * | 3/2001 | Johnson et al. ............ | 709/220 |
| 6,208,665 B1 | * | 3/2001 | Loukianov et al. ........ | 370/486 |
| 6,209,130 B1 | * | 3/2001 | Rector, Jr. et al. ............ | 725/50 |
| 6,226,272 B1 | * | 5/2001 | Okano et al. ............... | 370/259 |
| 6,249,526 B1 | * | 6/2001 | Loukianov .................. | 370/442 |

(Continued)

FOREIGN PATENT DOCUMENTS

WO        WO 97/20413        *  5/1997        ........... H04L 12/56

(Continued)

OTHER PUBLICATIONS

PCT, WO 97/20413.*

(Continued)

*Primary Examiner*—John Miller
*Assistant Examiner*—Annan Maxwell Shang

(57) ABSTRACT

An IP data transport method and system that makes efficient use of the subscriber television system bandwidth and uses the existing structure and equipment of the subscriber television system. The method allows several levels of IP data service within a subscriber television system. A subnet connection is established between an IP server in a headend and an external network. The existing communications paths within a subscriber television system are used to establish an IP communications route between the headend and a Home Communications Terminal (HCT). The data is communicated in an Motion Picture Experts Group (MPEG) format. Encapsulating the IP data into an MPEG format allows the existing systems to transport the IP data in the same packet streams it uses for video, audio, and control data.

32 Claims, 6 Drawing Sheets

U.S. PATENT DOCUMENTS

| | | | | |
|---|---|---|---|---|
| 6,272,150 B1 * | 8/2001 | Hrastar et al. | ............... | 370/486 |
| 6,314,465 B1 * | 11/2001 | Paul et al. | .................. | 709/226 |
| 6,324,177 B1 * | 11/2001 | Howes et al. | ................ | 370/389 |
| 6,360,276 B1 * | 3/2002 | Scott | ........................... | 709/245 |
| 6,442,158 B1 * | 8/2002 | Beser | ......................... | 370/352 |
| 6,470,389 B1 * | 10/2002 | Chung et al. | ................ | 709/227 |
| 6,473,426 B1 * | 10/2002 | Killian | ....................... | 370/393 |
| 6,501,755 B1 * | 12/2002 | McAllister et al. | .......... | 370/392 |
| 6,510,162 B1 * | 1/2003 | Fijolek et al. | ............... | 370/432 |
| 6,535,918 B1 * | 3/2003 | Bender et al. | .............. | 709/228 |
| 6,658,001 B1 * | 12/2003 | Furuno et al. | ............... | 370/392 |
| 6,697,360 B1 * | 2/2004 | Gai et al. | ................... | 370/389 |
| 6,795,709 B2 * | 9/2004 | Agrawal et al. | ......... | 455/452.1 |
| 6,816,495 B2 * | 11/2004 | Nishikado et al. | ........... | 370/401 |

FOREIGN PATENT DOCUMENTS

| | | |
|---|---|---|
| WO | WO 97/20413 | 6/1997 |

OTHER PUBLICATIONS

Laubach, M., "To Foster Residential Area Broadband Internet Technology; IP Datagrams Keep Going, and Going, and Going," Computer Communications, NL, Elsevier Science Publishers BV, Amsterdam, vol. 19, No. 11, Sep. 1, 1996.

Goldberg, L., "MCNS/DOCSIS Mac Clears a path for the Cable-Modem Invasion," Electronic Design, US, Penton Publishing, Cleveland, OH, vol. 45., No. 27, Dec. 1, 1997.

* cited by examiner

METHOD FOR DELIVERY OF IP DATA OVER MPEG-2 TRANSPORT NETWORKS

FIELD OF THE INVENTION

This present invention relates to data transport over subscriber television systems and, more specifically, to the transport of Internet Protocol (IP) data over digital broadband subscriber television systems.

BACKGROUND OF THE INVENTION

The number of people using the Internet from their home continues to increase. As the number of users increases, there is greater interest in increasing the speed of Internet Protocol (IP) data transport, which would reduce the amount of time required to access Internet sites and the amount of time spent waiting for files to download. Most Internet users currently use a twisted pair telephone line to access an Internet Service Provider (ISP), which provides access to the Internet. The bandwidth of a subscriber television system allows faster transport of IP data than existing twisted pair telephone lines. As a result, many Internet users are interested in switching to the subscriber television system as the IP data transport service becomes available. Subscriber television system operators provide IP data connections because they provide additional revenue.

Current systems for transporting IP data over subscriber television systems dedicate a fixed and separate portion of the bandwidth to each Internet user. Dedicating a portion of the bandwidth to each Internet user provides a continuous data path for each user. Fixing a portion of the bandwidth provides every Internet user with a standard sized portion of the available bandwidth. Assigning the IP data to IP-only channels or communications paths isolates the IP data from the data associated with other services provided on the subscriber television system. IP-only channels often use unique formats for the IP data. The Data Over Cable Service Interoperability Specification (DOCSIS) standard is an example of a current system that dedicates a fixed and separate portion of the bandwidth to each user.

Dedicating a fixed and separate bandwidth for each Internet user can strain the resources of an IP data transport system as a subscriber television system adds additional Internet users. While digital applications expand the amount of information that can flow through the bandwidth of a subscriber television system, there is still only so much bandwidth, which must carry television programming and other services in addition to IP data. As Internet users request access, the system assigns a fixed standard size portion of the bandwidth to each user regardless of each user's particular requirements. The operator of a subscriber television system sets a maximum amount of bandwidth for IP data transport. Once the amount of bandwidth reserved for IP data transport reaches that maximum, the system denies the next request for Internet access. The subscriber television operator then has to deal with the customer dissatisfaction resulting from the denied access.

An additional impact of dedicating bandwidth to each Internet user is that there are large periods of time when a user is reading information and not transmitting or receiving IP data. The bandwidth remains dedicated to each user even when it is not being used. This is an inefficient use of bandwidth. There are typically a large number of users reviewing material and not actively using the dedicated bandwidth. Once the system reaches the maximum bandwidth reserved for IP data transport it starts denying access. This results in the subscriber television system denying access to additional users because all of the allotted bandwidth has been allocated, even if it is not being used.

As mentioned above, current systems use a separate portion of the bandwidth to transport the IP data. Current systems use special IP data channels or out-of-band signals. This isolates the IP data from the other services. Accessing isolated IP data requires additional equipment at the headend, subscriber location, or both. For example, to access an IP data channel while a subscriber is tuning to a regular television channel requires a separate tuner for the IP data channel. It is even more complicated in systems that format the IP data differently than the other services. Systems using different formats often require additional equipment in the headend and at the subscriber location. DOCSIS is an example of a system that requires separate equipment in the headend and a separate tuner at the subscriber location. This additional equipment is an extra expense for a subscriber television system operator or subscriber.

Thus, there is a need for an IP data transport system that makes efficient use of the bandwidth and uses the existing structure and equipment of the subscriber television system. Such an efficient system should allow several levels or types of IP data service based on different types of IP data users.

DETAILED DESCRIPTION

Figure 1:
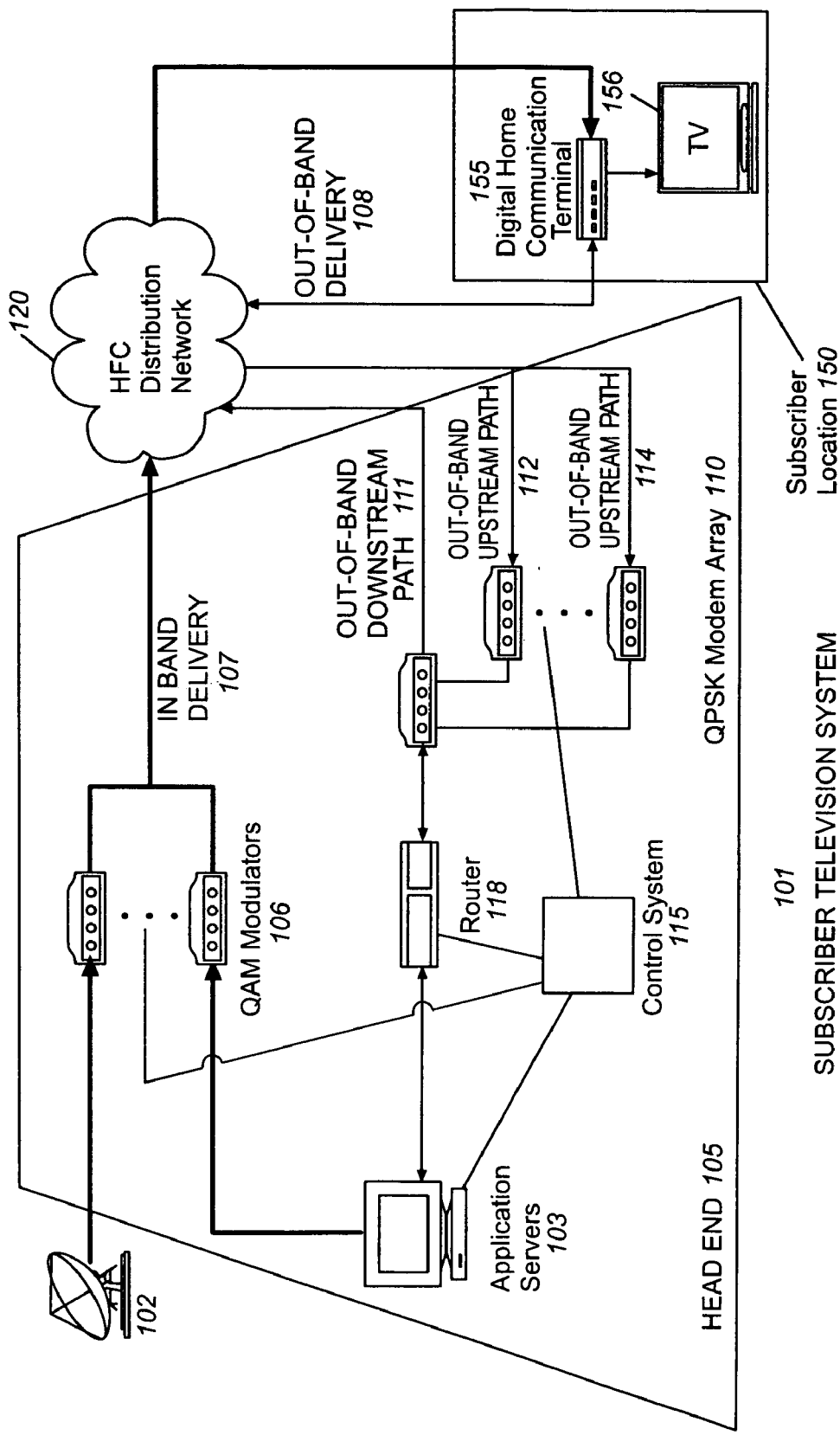
FIG. 1 is an overview of a Digital Broadband Delivery System (DBDS).

The present invention is directed to an efficient system and method for providing IP data over a subscriber television system, such as a cable television system. In an exemplary embodiment, the present invention provides an IP data transport mechanism that makes efficient use of the available bandwidth and uses the existing structure and equipment of a subscriber television system.

The present invention is best understood within the context of a two-way, interactive digital cable television system, which is referred to as a digital broadband delivery system (DBDS). The creation and release of IP data communications paths within a DBDS illustrate the use of the existing subscriber television system methods and equipment, and the resulting efficiencies produced by integrating the IP data communication into the existing structure. Referring now to the drawings, in which like numerals represent like elements throughout the several figures, the present invention will be described.

A Subscriber Television System for Transporting IP Data

FIG. 1 is an overview of a digital, interactive subscriber television system 101, which will provide the context for a discussion of the present invention. In this discussion, the subscriber television system 101 is also referred to as a Digital Broadband Delivery System (DBDS). The subscriber television system 101 uses MPEG transport streams for delivery of video, audio, and data entertainment services. These services are delivered via a broadband network to a plurality of home communications terminals (HCTs), such as the HCT 155 at subscriber location 150. An overview of the DBDS is provided in U.S. patent application Ser. No. 09/126,921, entitled "Conditional Access System", which is incorporated herein by reference.

In the subscriber television system 101, MPEG content source 102 provides MPEG formatted video, audio and control information to the headend 105. The MPEG content source 102 can be any of a variety of equipment such as a satellite receiver, a local encoder, or an application server 103. The MPEG formatted video, audio, and control information is processed in headend 105. The information is then combined with the other information specific to the subscriber television system 101, such as local programming and control information. The Quadrature Amplitude Modulation (QAM) modulators 106 combine the MPEG formatted information for delivery as the in-band data 107 via the transmission medium 120 to the subscriber location 150. The transmission medium 120 can incorporate one or more of a variety of media, such as fiber, coax, hybrid fiber-coax (HFC), or other transmission media. The digital HCT 155 receives and decodes the in-band data 107.

In the DBDS, video, audio, and control information are encoded as MPEG program streams, which are then multiplexed to form MPEG transport streams. Each MPEG transport stream is assigned to a QAM modulator 106 and modulated to a set frequency. For the HCT 115 to receive a television program, the HCT 115 must tune to the set frequency containing the television programming, de-multiplex the associated MPEG transport stream, and decode the appropriate MPEG program streams. The decoded television program is then transmitted to the TV 156 by the HCT 155 for display to the subscriber.

Control information and other data can be communicated as the in-band data 107 or as the out-of-band data 108. The out-of-band data 108 is transmitted to the HCT 155 by the Quadrature Phase-Shift Keying (QPSK) modem array 110 via out-of-band downstream path 111. Two-way communication utilizes the upstream portion of the out-of-band delivery system. Out-of-band data from the HCT 155 is received in headend 105 via out-of-band paths 112 or 114 between the HCT 155 and the QPSK modem array 110. The out-of-band control information is routed through router 118 to an application server 103. The out-of-band control information includes such information as a pay-per-view purchase instruction and a pause viewing command from the subscriber location 150 to video-on-demand type application server 103. A control system 115, such as Scientific-Atlanta's Digital Network Control System (DNCS), monitors, controls, and coordinates all communications in the subscriber television system 101, including video, audio, and data.

Figure 2:
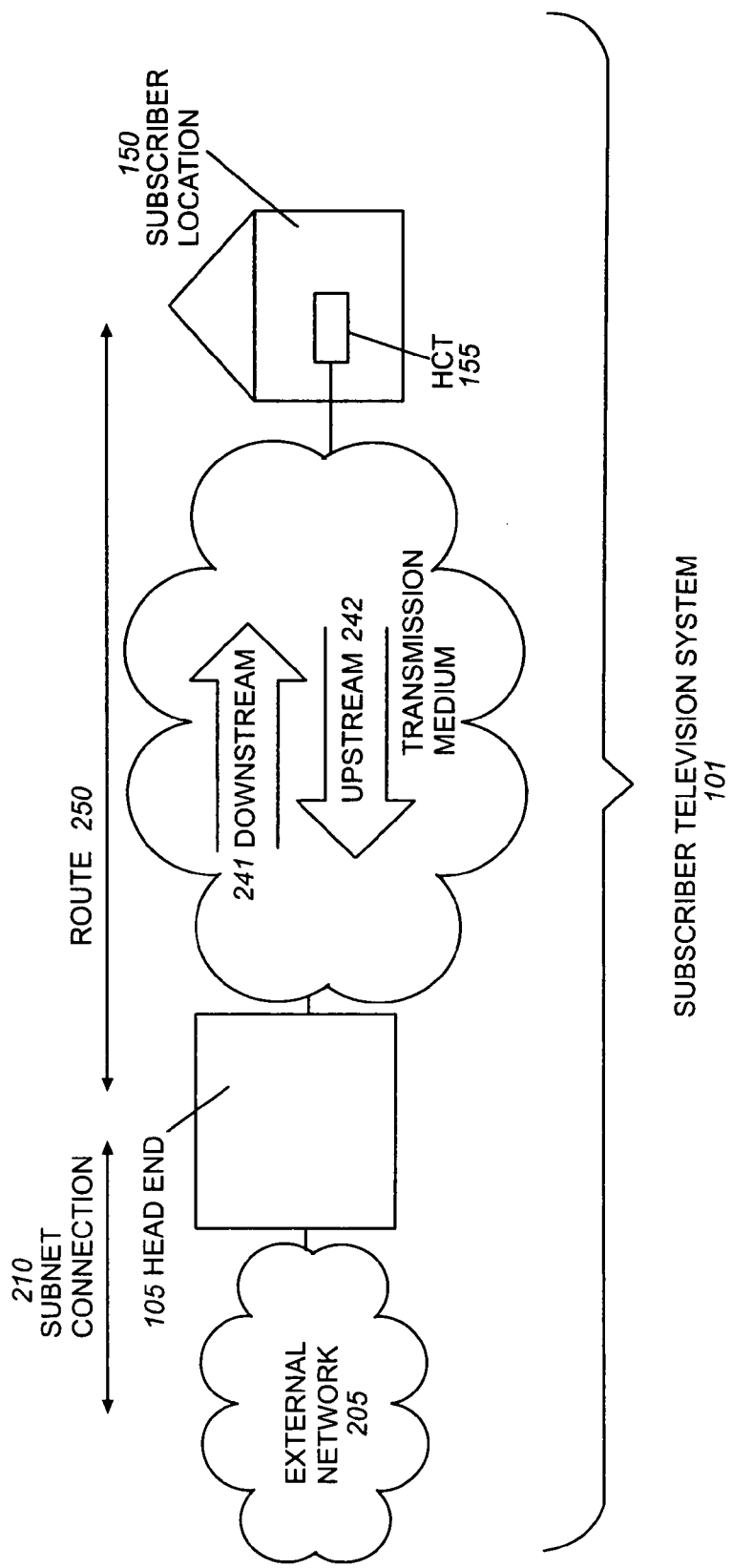
FIG. 2 is an overview of a system for transporting IP data between an external network and a subscriber location.

FIG. 2 is an overview of a system for transporting IP data between an external network 205, such as the Internet, and the HCT 155 at the subscriber location 150. The IP data transport occurs in two steps: between the external network 205 and the headend 105; and between the headend 105 and the HCT 155. This system also allows the transportation of IP data from one HCT to another HCT within the subscriber television system 101 via the headend 105.

In an exemplary embodiment, the subscriber television system 101 is connected to an external network 205, and the application server 103 (not shown in FIG. 2) is an IP server. In the headend 105, the IP server functions as a special type of application server 103. The IP server directs and coordinates the flow of IP data between the headend 105 and the external network 205 via a subnet connection 210. The subnet connection 210 is the logical connection to the external network 205 from the subscriber television system 101. The subnet connection 210 allocates bandwidth within the physical connections to the external network 205 for IP data communication to and from the subscriber television system 101. The establishment of the subnet connection 210 includes configuring the external network 205 to send IP data to and receive IP data from the subscriber television system headend 105.

The IP server also directs and coordinates the flow of IP data between the headend 105 and the HCT 155 via a route 250. The route 250 is a path for the flow of IP data within the subscriber television system 101. A communications route within the subscriber television system 101 includes a Continuous Feed Session (CFS) created when the subnet is established and the route 250. A route is established for each IP data connection. The route 250 includes both a downstream communications path 241 and an upstream communications path 242 within the transmission medium 120. Several routes may use the same CFS. A CFS is an existing mechanism used with MPEG transport streams. A CFS allocates a portion of an MPEG transport stream for a particular purpose. In this case, the route of the downstream IP data is located within the same MPEG transport stream that includes video and audio entertainment data. The IP data is encapsulated in an MPEG program stream and is sent to the HCT 155 via the same MPEG transport stream that is used to send audio and video to the HCT 155. To receive the IP data, the HCT 155 tunes to the correct frequency, demultiplexes the MPEG transport stream, and decodes the MPEG/IP data. If the HCT 155 is tuned to a QAM frequency for the viewing of a program and the IP data is in the same transport stream, no re-tuning is required. The IP data can be received in parallel to the television programming. The route 250 may be changed to maintain the parallel association between the tuning for receiving television programming and receiving IP data. The control information sent upstream by the HCT 155 includes the current tuning of the HCT 155. Using this information, the DNCS can dynamically change the route 250 so the user's IP data remains within the same MPEG transport stream as the currently tuned television program.

An advantage of the IP data using the same MPEG transport stream as the program information is that other features of the subscriber television system 101 can be applied to the IP data. For example, routing is controlled by the Digital Network Control System (DNCS). The DNCS can establish a security key associated with a specific route and a specific HCT. A security key provides security and privacy for the IP data connection unique to the specific HCT. In addition, subscriber television system 101 can address each HCT by its associated, unique Media Access Control (MAC) address. If the IP data for the HCT 155 is addressed to the unique MAC address for the HCT 155, then only the HCT 155 will accept that IP data.

Components within the subscriber television system 101, such as the IP server, use Digital Storage Media-Command and Control (DSM-CC) signaling to set-up IP data encapsulation, continuous feed sessions, and the route 250. The DSM-CC signaling protocol is described in U.S. Pat. No.

5,481,542, entitled "Interactive Information Services Control System", which is incorporated herein by reference.

Figure 3:
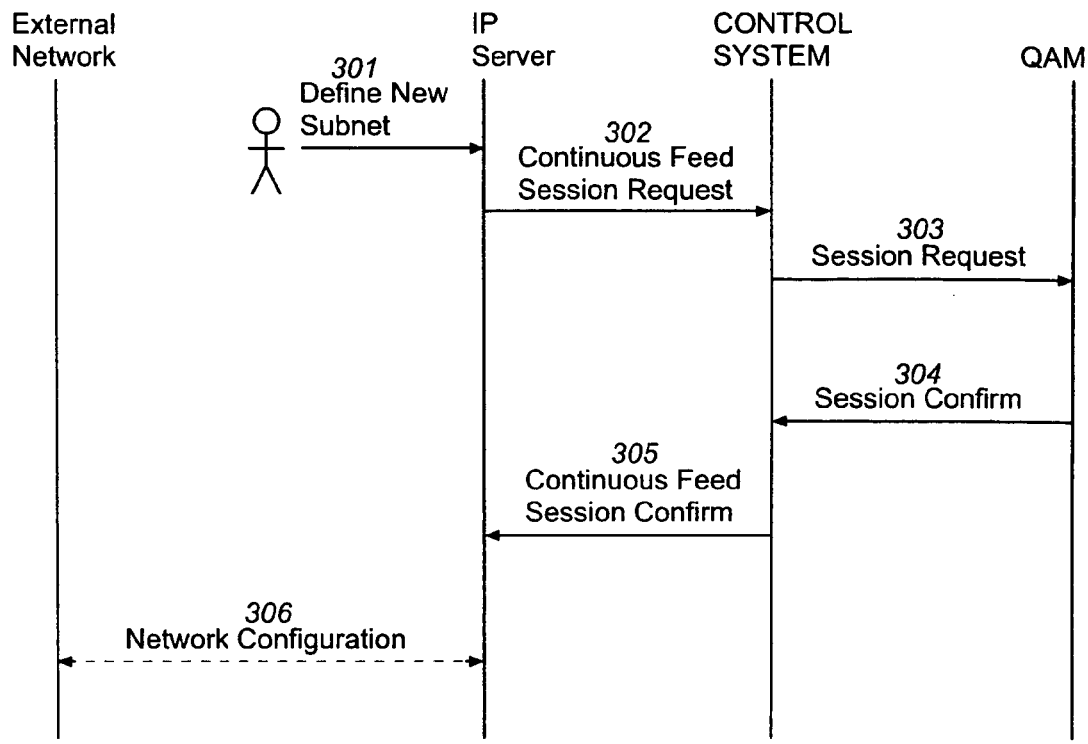
FIG. 3 illustrates a method for an IP server to add a subnet.

Creating Communications Paths for Transporting IP Data within a Subscriber Television System FIG. 3 illustrates a method for an IP server to add a subnet. A subnet connection is the logical connection to the external network from subscriber television system 101. Establishing a subnet includes dedicating bandwidth, configuring the links, and establishing the IP addresses that will be used between the external network 205 and the headend 105. Additionally, the main downstream paths within the subscriber television system 101, such as continuous feed sessions, are established in association with the subnet connection.

In an exemplary embodiment, the operator of the subscriber television system 101 defines a subnet (step 301) during initialization of the IP server, or at some later time. The process of defining a subnet includes deciding how big the path will be for IP data in and out of the subscriber television system 101 and the IP addresses that will be associated with the subnet.

Downstream IP data communications paths are associated with a defined subnet and are created after the subnet is defined. In an exemplary embodiment, upon defining a subnet, the IP server requests the control system 115 to reserve bandwidth for IP data communications as a CFS (step 302). At the request of the IP server, the control system 115 establishes a CFS for IP data within the downstream portion of in-band delivery 107 (FIG. 1). A CFS is a well-known mechanism for creating a pipeline or reserved portion of the bandwidth for a specific function. The present invention uses the CFS mechanism to create a downstream path for IP data. The IP server sends IP data to an IP data user at the subscriber location 150 via a portion of a CFS. An example of a specific function that would use a CFS is the downloading of a software upgrade to the HCT 155. To download a software upgrade, the software data is encapsulated into MPEG transport packets. The software data packets are inserted within the portion of the in-band delivery signal reserved for the CFS for delivery to the HCT 155.

The control system 115 requests the QAM modulators 106 to create a session (step 303). The request could also be directed to a Broadband Integrated Gateway (BIG) that interfaces to the QAM modulators 106. When the establishment of a session is confirmed, a confirm session message is sent to the control system 115 (step 304). The control system 115 confirms the establishment of a CFS to the IP server (step 305). Multiple CFSs may be created to allow the IP data to be positioned in different portions of the bandwidth. Multiple continuous feed sessions allow simultaneous single tuner data stream access for both entertainment programs and IP data. Thus, regardless of where the subscriber tunes, a CFS for IP data is within that portion of the bandwidth.

With the subnet defined and the CFS established, the IP server communicates with the external network 205. This communication would use the appropriate messaging for the external network 205 such as router interface protocol (RIP) if the external network interface is a router that supports RIP. The Media Access Control (MAC) address unique to the IP server must be communicated to the interface or link with the external network 205. This identifies the subscriber television systems interface (i.e., the IP server) to the external network 205. The group of public IP addresses that will be used during communications and that will be associated with the IP server must be communicated to the external network 205. The establishment of the subnet creates a presence for the subscriber television system 101 on the external network 205 and defines the communications path between the subscriber television system 101 and the external network 205 (step 306).

An IP data route defines the location of IP data designated for the HCT 155 within a downstream CFS pipeline and specifies the upstream communication path 242 for IP data from the HCT 155 to the IP server. There can be multiple downstream routes within a single CFS. Additionally the IP data route can specify an out-of-band data stream for downstream IP data communications as an option to the in-band CFS path for IP data from the IP server to the HCT 155. This out-of-band communications path is typically used to send system control and security entitlement messages to the HCTs. The control system 115 will prevent IP servers from overrunning the downstream out-of-band communications path and interfering with the control and entitlement data. The operator of the subscriber television system 101 can offer and charge for different levels of service based on these different options for the downstream communications path.

Figure 4:
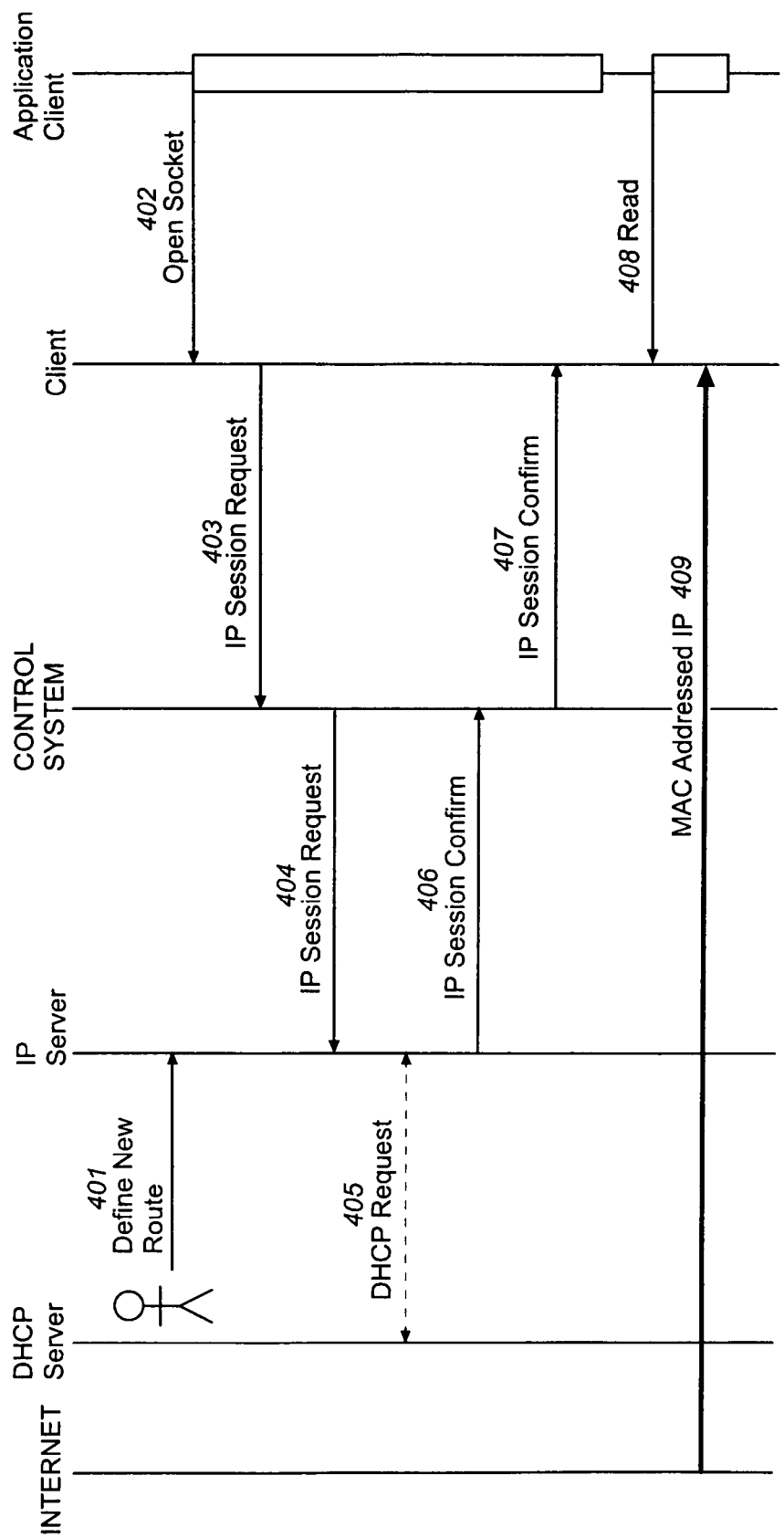
FIG. 4 illustrates a method for creating an IP data route between a Home Communications Terminal (HCT) and an IP server.

FIG. 4 is a diagram illustrating a method for creating an IP data route between HCT and an IP server. Creating an IP data route within a two-way digital network is similar to the operation that occurs when a computer is connected to an Internet Service Provider (ISP) using a dial up modem. When a computer application tries to access the dial-up network, the dial-up network client dials the phone number and logs the computer onto the ISP. At that point, IP connectivity is established between the computer application and the network.

IP data access can be required by various types of application programs associated with the HCT 155, such as a web browser running on the HCT 155 or on a computer or peripheral device (not shown) connected to the HCT 155. An application program's IP data requirements may result from a variety of activities, such as the selection of a television channel with a stock ticker, the selection of a hypertext link displayed by a web browser, or the selection of an "email" icon on the screen of the television 156. The application program interfaces with an IP data client on the HCT 155 for IP data access. The flow of IP data into and out of the HCT 155 is controlled by the IP data client. The IP data client is transparent to the user. The IP-based application programs exchange IP data with the IP server via the IP data client and allow the IP data client to handle the details of sending/receiving IP data from the HCT 155. The IP data client is the HCTs interface to the data route through the subscriber television system 101 to the IP server.

The operator of the subscriber television system 101 defines multiple general IP data routes within the subscriber television system 101 during the initialization of the IP server or at some later time (step 401). The establishment of a specific route for an IP connection to the HCT 155 is based on these defined general routes. Predefining multiple general routes allows specific routes to be easily changed. Typically, the HCT 155 has a single tuner for accessing both video and audio entertainment data and IP data. If a user changes the tuner to a different portion of the bandwidth while changing the television 156 channel, the IP data route can be dynamically switched to the same portion of the bandwidth in order to allow uninterrupted IP data communications.

If an application on the HCT 155 needs an IP connection, an open socket request is sent to the IP data client on the HCT 155 (step 402). The HCT 155 uses an existing upstream communication path within the subscriber television system 101 for normal communications with the control system 115. The IP data client sends the IP session request over this path to the control system 115 (step 403). The control system 115 sends the IP session request to the IP server (step 404). The IP server validates the authority of the HCT 155 for IP data connections and, if it is an authorized IP data user, assigns it an IP address.

Those skilled in the art will appreciate that there are various methods for providing IP addresses, such as the IP address coming from a pool of IP addresses provisioned into the IP server. Alternatively, it could be an IP address received by performing a proxy Dynamic Host Configuration Protocol (DHCP) request on behalf of the HCT 155 to the external network 205 (step 405). The IP server monitors upstream IP data traffic and waits for an IP data application program associated with the HCT 155 to perform a DHCP request. The IP server then automatically detects the IP address assigned by a DHCP server in the external network 205.

After the IP address has been assigned for the requested session or IP connection on the HCT 155, the IP server sends a session confirm message back to the control system 115 (step 406). The IP session request includes upstream communication requirements for the session. There can be additional messaging between the IP data client and the IP server to negotiate resources to support the upstream communication requirements. The control system 115 establishes a specific route for the IP connection based on one of the defined general routes including upstream and downstream paths. The continuous feed session the specific route uses for the downstream path is associated with the subnet of the IP address assigned to the session. The control system 115 sends the session confirm message to the HCT 155 (step 407). The session confirm message contains an IP resource descriptor describing the IP data upstream and >downstream paths for the HCT 155. This message includes tuning resource descriptors. The tuning resource descriptors instruct the HCT 155 how to tune to the MPEG transport stream transporting the downstream IP data for the HCT 155. It also includes IP resource descriptors containing the IP address that was assigned to the session.

When the IP server receives IP data for the IP address associated with the HCT 155, the IP server encapsulates the IP data into MPEG transport packets with the MAC address of the HCT 155 in the header. The MPEG packets are combined into the MPEG transport stream of the designated downstream route. Upon receiving a successful session confirm message, the HCT 155 tunes to the appropriate QAM frequency. The HCT 155 creates a filter to identify the IP data within the MPEG transport stream that has its MAC address. After receiving the session confirm message, the IP data application program associated with the HCT 155 issues read commands to read the identified IP data (step 408). The HCT 155 then completes the read commands and retrieves the IP data for the application program (step 409).

IP data that is sent from an application on the HCT 155 to the external network 205 is transported over an upstream path 242. The upstream route for IP data from the HCT 155 is determined by the level of service requested by an application on the HCT 155 or authorized by the operator of the subscriber television system 101. In an exemplary embodiment, the upstream path is a QPSK modulated carrier. The upstream QPSK modulated carrier is divided into time allocations or slots. Each slot transports 48 bytes of data. Since these slots are shared by all of the HCTs connected to the QPSK modem array 110, a clock embedded in the downstream QPSK channel synchronizes the slots. Over the period of one second, each slot has a particular slot number associated with it. The QPSK modem array 110 makes the determines which slots are allocated for a particular use. Information regarding slot allocation is communicated to the HCT 155 in the session confirm message. There are a variety of methods for transmitting data on one of the upstream slots. The subscriber television system can offer and charge for different levels of service based on these different methods. The method can be dynamically changed during a session by the IP client or the system operator. For example, a session could start using a method with slots reserved specifically for the session and, if there is no activity for more than five minutes, the session could be automatically switch by the system operator to a method with no reserved slots. Each method or combination of methods will provide a different Quality of Service (QoS) to the IP data application. In an exemplary embodiment, three methods or transmission protocols are included: Time Division Multiple Access (TDMA), Slotted-Aloha, and request data slot allocation.

The TDMA protocol provides an application on the HCT 155 with a number of slots that are guaranteed to be available to the HCT 155. These slots are reserved for the HCT 155 during the session set-up scenario and are released when the session is torn down. TDMA slots may be spaced to provide a low latency upstream path. This supports applications that need a fast interface between the IP data client and IP server. Games requiring instantaneous feed back fall into this category. Although the regular spacing of slots works well for information that easily fits into the slot, IP data also involves the transportation of large data files. A large file is divided into several slot-sized packets. If the packets can be sent together, there is less time spent waiting on the entire file to be received and verified. Therefore, in addition to regular spacing, slots may be grouped together to allow larger payloads to be accommodated in a more efficient manner.

The TDMA type session set-up actually reserves a specific allocation of slots for a session. Resource descriptors included in the session confirm message informs the HCT 155 which slots are allocated to that session. Using TDMA protocol, an application has a set QoS and does not compete with the other HCTs on the subscriber television system 101 for upstream bandwidth.

The Slotted Aloha protocol provides a best effort or opportunistic delivery of IP datagrams from the HCT 155 to the IP server. When an application is configured to use slotted aloha, it sends data on a slotted aloha slot whenever it has data to send. When the QPSK modem array 110 receives a complete message over the slotted aloha communications path, it echoes the header of the IP data message back over the downstream QPSK channel. The HCT 155 must receive this header in order to determine if the data was successfully sent. If the data was not received by the QPSK modem array 110, no echo is sent and the HCT 155 tries to send the IP data again on the next available slot. Before resending the data, the HCT 155 waits a random period of time to minimize the chance of data collisions. There are no configuration parameters required to set-up the HCT 155 for sending slotted aloha IP data. An upstream descriptor is included in the session confirm message to inform the HCT 155 application that it is using this protocol. The control system 115 keeps track of the number of HCTs using the slotted aloha slots. This information may be used to determine the average QoS at any given time for the slotted aloha portion of the upstream communications path. With the Slotted Aloha protocol, no slot or bandwidth is reserved, so unused slots are available to other IP data users. The Slotted Aloha protocol provides a more efficient use of the bandwidth.

Request data slot allocation is a combination of slotted aloha and TDMA. Periodically, the QPSK modem array 110 will send a message to all HCTs authorized for IP data connections allowing them to request upstream slots. HCTs with data to send respond to this message. The QPSK modem array 110 then assigns a number of data slots to a responding HCT so it may send data. These slot assignments are only valid once, so if an HCT has additional data to send, it must request more slots. Like slotted aloha, there are no specific configuration parameters other than a resource descriptor that informs the HCT to use the request data slot allocation protocol to obtain slots. The request data slot allocation protocol is very efficiently since slots are assigned only to an HCT with data to send.

Figure 5:
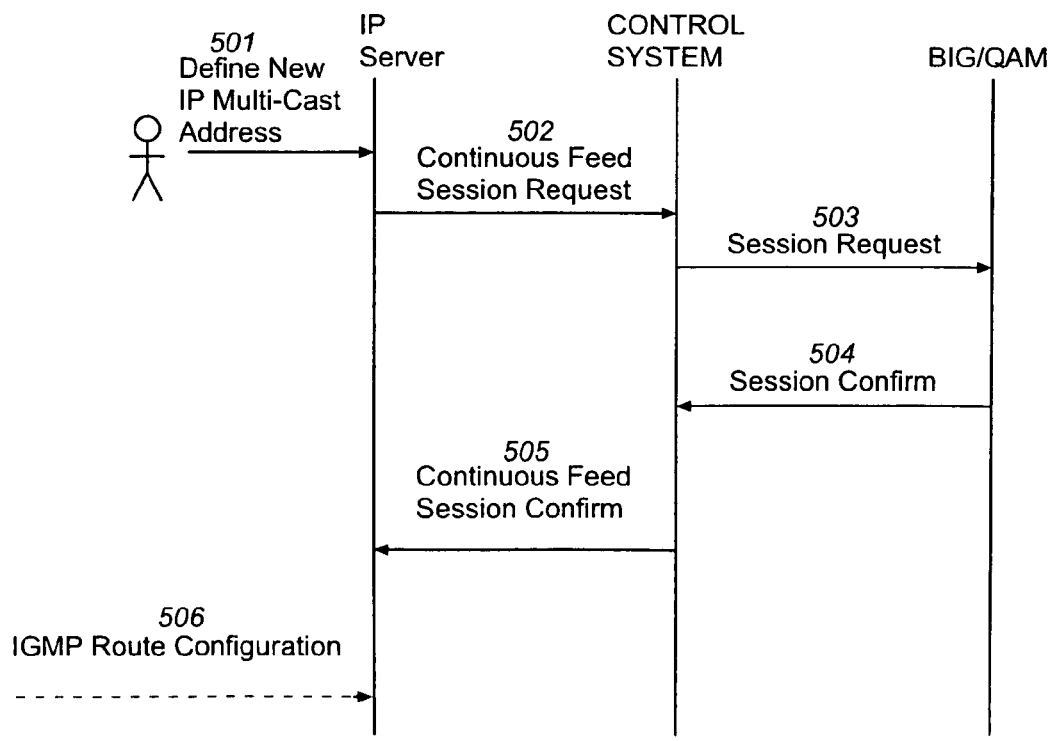
FIG. 5 illustrates a method for an IP server to add an IP Multicast route.

FIG. 5 illustrates a method for an IP server to add an IP Multicast route. Multicast IP addresses are used on the Internet to provide web-casting services. Routing of Multicast IP data is very similar to routing IP data that is addressed to a specific HCT. Instead of addressing the packets to the MAC address of a specific HCT, the Multicast packets are addressed using the Internet Engine Task Force (IETF) Multicast to MAC address mapping scheme.

The operator of the subscriber television system 101 decides which Multicast IP data sources will be carried over the subscriber television system 101. The operator can allow any requested Multicast IP data source to be dynamically activated or may, to control the content, create a database of allowable Multicast IP data sources. An allowable Multicast IP data sources database would include some Multicast IP data sources that are always active and some Multicast IP data sources that are dynamically activated upon request. The selected Multicast IP data addresses and associated subnets are assigned and stored in an IP server database by the operator of the subscriber television system 101 during initialization of the IP server or at some later time (step 501). This step can occur in real time. The IP server requests a bandwidth reservation from the transport network by sending a Continuous Feed Session Request message to the control system 115 (step 502). This request contains the bandwidth reservation requirements for the session and the type of delivery mechanism that the IP server will use to get the encapsulated data into the downstream path.

The control system 115 identifies the appropriate subscriber television system component(s), such as the BIG or one of the QAM modulators 106, to set-up a downstream pathway for the requested session. The control system 115 requests and sets up a session on the identified component(s) (step 503). The messaging used is an internal signaling protocol between the control system 115 and the identified component(s). When the session set-up is confirmed by the BIG and/or the QAM modulators 106 (step 504), the control system 115 informs the IP server by sending the Continuous Feed Session Confirm message (step 505). The IP server may then begin sending Multicast IP data over the indicated route. The IP server informs the external network 205 to send the Multicast IP datagrams for the Multicast address to the IP server's MAC address (step 506). This is done using the appropriate messaging for the external network 205. If the link to the external network 205 is a router that supports Internet Group Multicast Protocol (IGMP), this message is an IGMP message. The message includes the new Multicast IP address and the MAC address of the IP server.

It is not required that each Multicast address be transported over a separate session. It is possible that any or all Multicast addresses and subnets may be sent over the same session. When all the Multicast addresses are in the same CFS, an IP data user can tune to a single CFS for all Multicast IP data. This is determined by the configuration of the IP server. In the case where multiple Multicast addresses or IP subnets are sharing the same session, steps 502–505 of this method are executed only once.

After the completion of this scenario, a CFS is available to transport encapsulated IP datagrams over the reserved bandwidth and the external network is configured to route IP datagrams to the IP server. Because Multicast IP is a broadcast service, the IP server will immediately begin sending Multicast IP data for the defined Multicast IP address over the subscriber television system 101.

Figure 6:
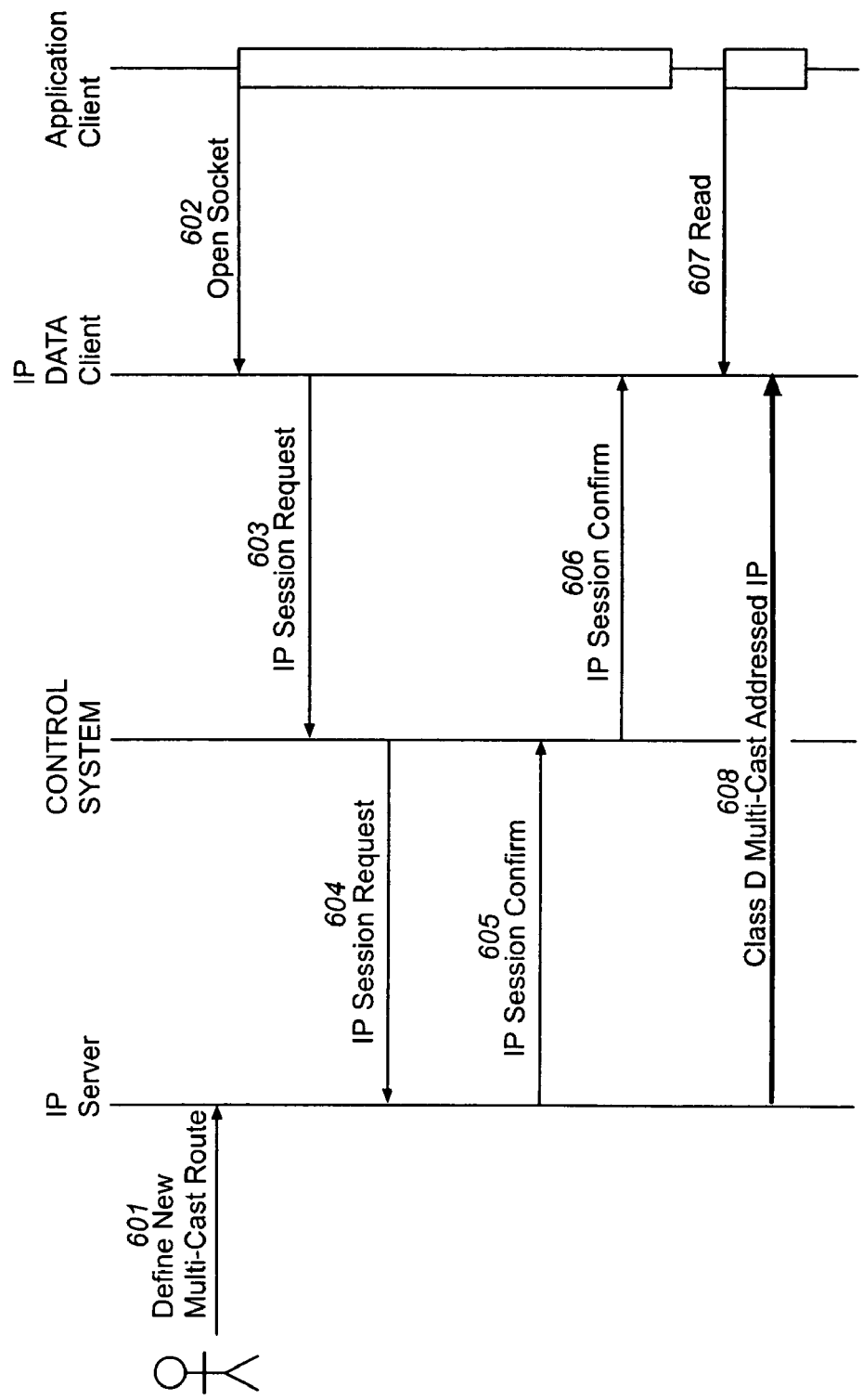
FIG. 6 illustrates a method for an HCT to access an IP Multicast route and receive the multicast IP data.

FIG. 6 illustrates a method for an HCT to access an IP Multicast route and receive the multicast IP data. The operator of the able television system 101 defines multiple IP data routes within the subscriber television system 101 during initialization of the IP server or at some later time (step 601).

Unlike the method where the HCT 155 is assigned an IP address and IP traffic is routed to that address, this method requires that the HCT 155 request the IP Multicast address of each IP Multicast data source. The Multicast IP data routes may be allocated across different portions of the bandwidth. The HCT 155 is required to contact the IP Server to determine how to tune to each particular IP Multicast data source.

An application program, associated with the HCT 155, opens a socket by sending a request to the IP data client and requesting a connection to a Multicast IP data source (step 602). The IP data client determines that the socket requires a connection to the Internet. The IP data client sends a session set up request to the control system 115 with the address of the IP server and the requested Multicast IP data source (step 603). The control system 115 routes the request to the IP server (step 604). The IP server validates the authority of the HCT 155 for IP data connections. If the HCT 155 is an authorized IP data user, the IP server determines if data from the Multicast IP data source is currently being sent in a CFS. If it is not, the IP server may dynamically add the Multicast subnet and route. When the IP server has determined which CFS contains IP data from the Multicast IP data source, it sends a session confirm message to the control system 115 (step 605). The control system 115 sends the session confirm message to the HCT 155 (step 606). This message includes tuning resource descriptors instructing the HCT 155 to tune to the transport stream that includes IP data from the Multicast IP data source. Upon receiving a successful confirm message, the HCT 155 tunes to the appropriate portion of the bandwidth, such as a specific QAM frequency, and creates a filter for receiving the Multicast IP data. The filter is created using the MAC address mapping included in the session confirm message for the Multicast IP route. At the HCT 155, the IP data application issues read commands on the socket (step 607). The IP server receives and encapsulates Multicast IP data from the external network 205 using a Multicast mapped MAC address. The IP server sends Multicast IP data with the mapped MAC address via the CFS. The read command is completed when the HCT 155 receives the Multicast IP data with the mapped MAC address (step 608).

The creation of a Multicast IP route and subnet may be deferred until access to that particular Multicast IP data source is requested by the HCT 155. The methods described in FIG. 5 and FIG. 6 may be combined to dynamically allow access to a particular Multicast IP data upon request.

Releasing Communications Paths for Transporting IP Data within a Subscriber Television System The creation of a subnet reserves a portion of the bandwidth of transmission medium 120 for IP data communications as a continuous feed session (CFS). If the bandwidth is not being used, it is more efficient to release the bandwidth in order to allow other subscriber television system services to utilize the bandwidth.

When an existing subnet is removed from the IP server database, the associated CFS's reserved bandwidth in transmission medium 120 is released and the external network 205 is configured to stop sending IP datagrams for that subnet to the IP server. Additionally, any routes using the removed subnet are torn down and any additional resources used by those routes are released, including upstream communication paths.

Figure 7:
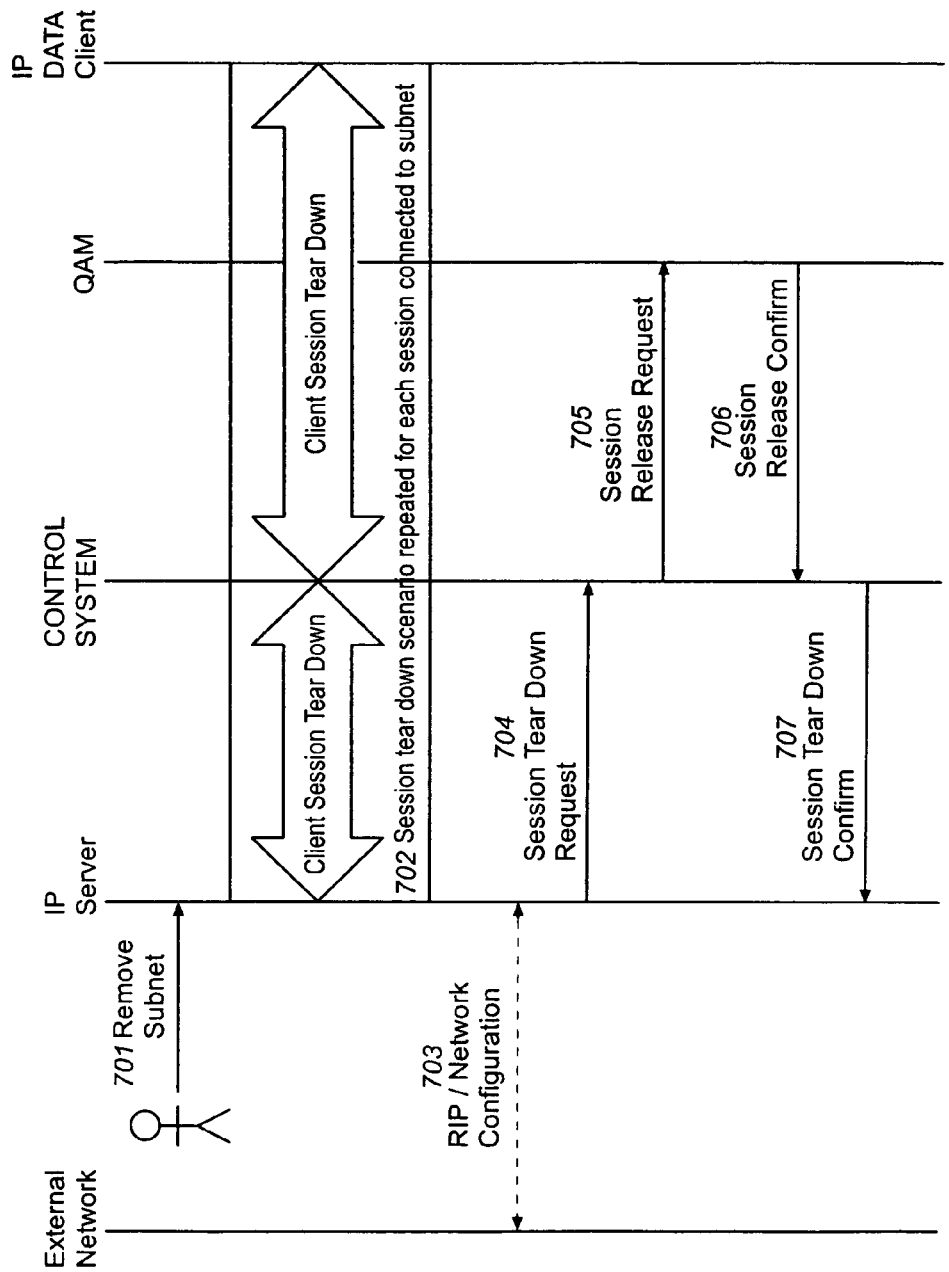
FIG. 7 illustrates a method for removing a subnet from an IP server.

FIG. 7 illustrates a method for removing a subnet from an IP server. In an exemplary embodiment, when an IP subnet is removed from the IP server, all IP data routes connected to the continuous feed session transporting that subnet must first be torn down. In the method of FIG. 7, the subscriber television system operator instructs the IP server to delete a subnet (step 701).

Before removing the subnet, the IP server initiates a route tear down message for each IP data route connected to the subnet. The IP server sends each route tear down message to the control system 115. The route tear down message can include the CFS and all associated routes to be removed. The control system 115 sends the route tear down message to the appropriate components in the headend 105 and to the IP client on the HCT 155. The route is torn down and any resources used by the route are released. Step 702 includes the messaging, tear down instructions, actual removal of the route from the IP database, and the release of any resources.

Once all necessary routes are released, the IP server informs the external network 205 to stop sending IP datagrams for that subnet to the IP server (step 703). This is done using the appropriate messaging for the external network 205. In the case where the link to the external network 205 is a router that supports RIP, this message is a RIP message with the appropriate information.

The IP server releases the reserved bandwidth by sending a session tear down message to the control system 115 (step 704). The control system 115 releases the session on the appropriate components, such as the BIG or one of the QAM modulators 106, by sending a session tear down message (step 705). This messaging from control system 115 could use internal signaling protocol between control system 115 and the appropriate components. The session release is confirmed by the BIG and/or QAM (step 706). The control system 115 confirms to the IP server that the CFS has been removed using the session tear down confirm message (step 707). After the completion of step 707, the resources used by the subnet are available and IP Datagrams for that subnet are no longer sent to the IP server.

The release of an IP route may be initiated by the IP server, by the operator of the subscriber television system 101, by the IP data user, or by the IP data client. If the route release is initiated by the HCT 155, a message is sent to the IP server. The IP server then determines what to do with the route. The route could be reassigned, maintained in an idle state, or torn down. If the route is to be torn down the IP server initiates step 702, including the messaging, tear down instructions, actual removal of the route from the IP database, and the release of any resources.

CONCLUSION

From the foregoing, it will be appreciated that the present invention provides an IP data transport method and system that makes efficient use of the bandwidth and uses the existing structure and equipment of an interactive digital subscriber television system. The present invention also allows several types, or levels, of IP data service within a subscriber television system. The present invention assigns a true Internet visible IP address, even if just on a temporary basis, to the IP data application on an HCT. The assignment of a true Internet visible IP address provides a familiar environment for developers of PC and workstation applications to develop applications for the HCT 155.

Those skilled in the art will appreciate that the physical IP server may be a single physical component, may be a module within another physical component, or may include several physical components. For example, a configuration could include one physical IP server component performing the addressing, routing, and subnet management functions while other components perform the IP data handling functions, such as the IP data encapsulation into MPEG transport packets. The IP server may include the functionality of an Internet Service Provider (ISP). An ISP module located within the physical IP server would be configured to send and receive the IP data directly with the external network 205.

The present invention has been described in relation to particular embodiments, which are intended in all respects to be illustrative rather than restrictive. For example, although the present invention has been described in the context of a two-way digital broadband subscriber system that transports MPEG data and uses QAM and QPSK modulation, those skilled in the art will appreciate that the present invention may be employed in one-way systems and systems using other encoding and modulation techniques. As an additional example, although the present invention has been described in the context of using DSM-CC methods for signaling and IP data encapsulation, those skilled in the art will appreciate that the present invention may be employed using other signaling and IP data encapsulation techniques.

In conclusion, while exemplary embodiments of the invention have been illustrated and described, it will be clear that the invention is not so limited. Alternative embodiments will be apparent to those skilled in the art to which the present invention pertains without departing from its spirit or scope. Accordingly the appended claims rather than the foregoing description define the scope of the present invention.

What is claimed is:

1. A method for transporting Internet Protocol data over a subscriber television system including a headend, a transmission network, and a plurality of Home Communication Terminals, with at least one Home Communications Terminal authorized for receiving the Internet Protocol data, comprising the steps of:

receiving at the headend a request for an Internet Protocol connection from the authorized Home Communication Terminal;

assigning at the headend an Internet Protocol address to the authorized Home Terminal for the duration of the Internet Protocol connection;

establishing a subnet connection for transporting the Internet Protocol data from a server in the headend to an external network, wherein the external network is different from the transmission network, comprising the steps of:

determining bandwidth of the subnet connection;
communicating to the external network a group of IP addresses associated with the server;
establishing a route for the Internet Protocol data from the authorized Home Communications Terminal to the server and from the server to the authorized Home Communications Terminal over the transmission, wherein at least a portion of the route for the Internet Protocol data is adapted to carry a plurality of IP datagrams destined for a plurality of non-multicast IP addresses;
transmitting from the headend to the authorized Home Communications Terminal the route for the Internet Protocol connection;
communicating between the authorized Home Communications Terminal and the external network via the route and the subnet connection; and
releasing the route and assigned Internet Protocol address upon termination of the Internet Protocol connection.

2. The method of claim 1, wherein the Internet Protocol data is encapsulated and communicated between the authorized Home Communications Terminal and the headend within a digital data stream that includes television programming.

3. The method of claim 2, wherein the Internet Protocol data is encapsulated into Motion Picture Experts Group (MPEG) transport packets.

4. The method of claim 1, wherein the step of assigning an Internet Protocol address includes correlating the assigned Internet Protocol address to a Media Access Control (MAC) address associated with the authorized Home Communications Terminal.

5. The method of claim 1, wherein the step of establishing the route for the Internet Protocol data includes establishing and using a portion of a continuous feed session for the Internet Protocol data from the server to the authorized Home Communications Terminal.

6. The method of claim 1, wherein the steps of establishing and releasing the route for Internet Protocol data comprises Digital Storage Media-Command and Control (DSM-CC) signaling techniques.

7. The method of claim 1, wherein the step of establishing a route includes using a protocol for the Internet Protocol data from the authorized Home Communications Terminal to the server, the protocol being selected from Time Division Multiple Access, Slotted-Aloha, and request data slot allocation.

8. The method of claim 1, wherein the step of establishing a route for the Internet Protocol data includes establishing and using a session security key uniquely associated with the route.

9. A method for transporting Internet Protocol data over a subscriber television system including a headend, a transmission network, and a plurality of Home Communications Terminals, with at least one Home Communications Terminal authorized for receiving the Internet Protocol data, comprising the steps of:
receiving at the headend a request for an Internet Protocol connection from the authorized Home Communications Terminal, including a Media Access Control (MAC) address associated with the authorized Home Communications Terminal;
assigning at the headend an Internet Protocol address to the authorized Home Communications Terminal for the duration of the Internet Protocol connection;
establishing a subnet connection for transporting the Internet Protocol data from a server in the headend to an external network, wherein the external network is different from the transmission network, comprising the steps of:
determining bandwidth of the subnet connection;
communicating to the external network a group of IP addresses associated with the server;
maintaining in a database in the headend, a relationship between the assigned Internet Protocol address and the Media Access Control (MAC) address associated with the authorized Home Communications Terminal, the relationship being maintained for at least the duration of the Internet Protocol connection;
establishing a downstream route for the IP data from the server to the authorized Home Communications Terminal over the transmission network within a downstream bandwidth, wherein the downstream bandwidth includes at least a portion of a television program, wherein the downstream route for the Internet Protocol data is adapted to carry a plurality of IP datagrams destined for a plurality of non-multicast IP addresses;
establishing an upstream route for the Internet Protocol data from the authorized Home Communications Terminal to the server over the transmission network within an upstream bandwidth, wherein the upstream route uses a protocol selected from Time Division Multiple Access, Slotted-Aloha, and request data slot allocation;
transmitting from the headend to the authorized Home Communications Terminal information regarding the downstream route and the upstream route for the Internet Protocol connection;
communicating the Internet Protocol data between the authorized Home Communications Terminal and the server via the downstream route and the upstream route, wherein the Internet Protocol data is encapsulated into packets;
communicating the Internet Protocol data between the server and the external network via the subnet connection; and
releasing the assigned Internet Protocol address, the downstream route and the upstream route upon termination of the Internet Protocol connection.

10. A method of creating and removing Internet Protocol data communications paths within a television system, comprising the steps of:
establishing a subnet connection between the television system and an external network;
comprising the steps of:
determining bandwidth of the subnet connection;
communicating to the external network a group of IP addresses associated with the television system;
establishing a continuous feed session within the television system for the transportation of the Internet Protocol data;
receiving a request for an Internet Protocol connection;
assigning an Internet Protocol address for the duration of the Internet Protocol connection to the requester of the Internet Protocol connection;
designating a route including at least a portion of the continuous feed session for the Internet Protocol data for the duration of the Internet Protocol connection, wherein the downstream route for the Internet Protocol data is adapted to carry a plurality of IP datagrams destined for a plurality of non-multicast IP addresses;
communicating the Internet Protocol data over the established subnet and designated route for the duration of the Internet Protocol connection; and releasing the Internet Protocol address assignment and the route designation within the television system upon termination of the Internet Protocol connection.

11. The method of claim 10, wherein the steps of establishing a continuous feed session and releasing the route designation comprises Digital Storage Media-Command and Control (DSM-CC) signaling techniques.

12. An application server for establishing, using, and deleting an Internet Protocol data communications route within a television system between the application server and an authorized Home Communications Terminal and between the application server and an external network, the application server comprising:

means for establishing an external communications route between an external network and the application server located in a headend of the television system, for communicating to the external network a group of IP addresses associated with the application server, for communicating Internet Protocol data between the application server and the external network using an Internet Protocol address from the application server, and for releasing the external communications route;

a processor for requesting the establishment of an internal communications route between the authorized Home Communications Terminal requesting an Internet Protocol connection and the application server for the duration of the Internet Protocol connection, for releasing the internal communications route upon termination of the Internet Protocol connection, and for communicating Internet Protocol data between the authorized Home Communications Terminal and the application server over the internal communications route, wherein the Internet Protocol address for communicating with the external network is associated with the authorized Home Communications Terminal for the duration of the Internet Protocol connection and is released upon termination of the Internet Protocol connection, wherein at least a portion of the internal communications route is adapted to carry a plurality of IP datagrams destined for a plurality of non-multicast IP addresses; and means for encapsulating and unencapsulating the Internet Protocol data for communication between the authorized Home Communications Terminal and the application server.

13. The application server of claim 12, wherein the means for encapsulating and unencapsulating uses Motion Picture Experts Group (MPEG) transport packets for the Internet Protocol data.

14. The application server of claim 12, wherein the processor uses a Media Access Control (MAC) address of the authorized Home Communications Terminal to associate with the Internet Protocol address for communicating with the external network.

15. The application server of claim 12, wherein the internal communications route uses at least a portion of a continuous feed session for communications from the applications server to the authorized Home Communications Terminal.

16. The application server of claim 12, wherein the internal communications route uses a protocol for communications from the authorized Home Communications Terminal to the applications server, the protocol selected from Time Division Multiple Access, Slotted-Aloha, and request data slots allocation.

17. The application server of claim 12, wherein the establishment of the internal communications route uses Digital Storage Media-Command and Control (DSM-CC) signaling techniques.

18. An application server for establishing and using an Internet Protocol data communications route within a television system between the application server and an authorized Home Communications Terminal and between the application server and an external network, the application server comprising:

means for receiving a request for an Internet Protocol connection from an authorized Home Communications Terminal;

means for requesting establishment of an internal communications route for Internet Protocol data within the television system between the applications server and the authorized Home Communications Terminal, wherein the internal communications route requested is based on the type of Internet Protocol data connection required by the authorized Home Communications Terminal, wherein at least a portion of the internal communications route is adapted to carry a plurality of IP datagrams destined for a plurality of non-multicast IP addresses;

means for assigning an Internet Protocol address to the authorized Home Communications Terminal for the duration of the Internet Protocol connection; a memory for maintaining a database of all Internet Protocol addresses associated with the application server and for maintaining the relationship of the authorized Home Communications Terminal and the assigned Internet Protocol address associated with the authorized Home Communications Terminal at least for the duration of an Internet Protocol connection;

means for communicating to the external network a group of IP addresses associated with the application server;

means for encapsulating the Internet Protocol data received from the external network for communication to the authorized Home Communications Terminal and unencapsulating the Internet Protocol data received from the authorized Home Communications Terminal for communication to the external network; and means for releasing the internal communications route for Internet Protocol data upon termination of the Internet Protocol connection.

19. The application server of claim 18, wherein the means for encapsulating and unencapsulating uses Motion Picture Experts Group (MPEG) transport packets for the Internet Protocol data.

20. The application server of claim 18, wherein the establishment of the internal communications route uses Digital Storage Media-Command and Control (DSM-CC) signaling techniques.

21. A subscriber television system for communicating Internet Protocol data with an external network, the system comprising:

a Home Communications Terminal capable of encapsulating and unencapsulating the Internet Protocol data;

a headend, wherein the headend includes:

an interface to an external network for establishing a subnet connection to the external network and for communicating the Internet Protocol data with the external connection, the subnet connection identifying at least one Internet Protocol address that will be used between the external network and the headend;

means for establishing, maintaining, communicating over, and releasing a communications route from the applications server to the Home Communications Terminal within the subscriber television system, wherein at least a portion of the communications route is adapted to carry a plurality of IP datagrams destined for a plurality of non-multicast IP addresses;

means for encapsulating and unencapsulating the Internet Protocol data for communication with the Home Communications Terminal; and a transmission network for connecting the Home Communications Terminal to the headend.

22. The subscriber television system of claim 21, wherein the headend means for encapsulating and unencapsulating the Internet Protocol data uses Motion Picture Experts Group (MPEG) transport packets for the Internet Protocol data.

23. The subscriber television system of claim 22, wherein the Motion Picture Experts Group (MPEG) transport packets for the Internet Protocol data include in each Motion Picture Experts Group (MPEG) transport packet header a Media Access Control (MAC) address associated with the Home Communications Terminal.

24. The subscriber television system of claim 21, wherein the headend includes a subscriber television system controller for establishing and releasing a continuous feed session.

25. The subscriber television system of claim 24, wherein the continuous feed session supports multicast Internet Protocol data from the external network.

26. The subscriber television system of claim 21, wherein the means for establishing, maintaining, communicating over, and releasing the communications route uses at least a portion of a continuous feed session.

27. The subscriber television system of claim 21, wherein the means for establishing, maintaining, communicating over, and releasing the communications route uses a protocol for communications from the Home Communications Terminal to the application server, the protocol selected from Time Division Multiple Access, Slotted-Aloha, and request data slot allocation.

28. The subscriber television system of claim 21, wherein the means for establishing, maintaining, communicating over, and releasing the communications route allows the external network using Dynamic Host Configuration Protocol to assign an Internet Protocol address to the Home Communications Terminal.

29. The subscriber television system of claim 21, wherein the headend includes a means for correlating a public Internet Protocol address associated with the headend to a Media Access Control (MAC) address associated with the Home Communications Terminal.

30. The subscriber television system of claim 21, wherein the Home Communications Terminal includes a means for using and the headend includes a means for establishing and using a session security key uniquely associated with the communication route.

31. The subscriber television system of claim 21, wherein the means for establishing, maintaining, communicating over, and releasing the communications route is responsive to the tuning of the Home Communications Terminal and modifies the communications route based on the tuning of the Home Communications Terminal.

32. The subscriber television system of claim 21, wherein the means for establishing, maintaining, communicating over, and releasing the communications route uses Digital Storage Media-Command and Control (DSM-CC) signaling techniques.

* * * * *